(12) United States Patent
Tanaka

(10) Patent No.: US 10,173,476 B2
(45) Date of Patent: Jan. 8, 2019

(54) PNEUMATIC TIRE

(71) Applicant: SUMITOMO RUBBER INDUSTRIES, LTD., Kobe-shi, Hyogo (JP)

(72) Inventor: Satoshi Tanaka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 406 days.

(21) Appl. No.: 14/555,254

(22) Filed: Nov. 26, 2014

(65) Prior Publication Data
US 2015/0151589 A1  Jun. 4, 2015

(30) Foreign Application Priority Data

Dec. 4, 2013  (JP) .................................. 2013-251358

(51) Int. Cl.
*B60C 11/12* (2006.01)
*B60C 11/13* (2006.01)
*B60C 11/03* (2006.01)

(52) U.S. Cl.
CPC ...... *B60C 11/1315* (2013.01); *B60C 11/0306* (2013.01); *B60C 11/0309* (2013.01); *B60C 11/125* (2013.01); *B60C 11/13* (2013.01); *B60C 2011/0353* (2013.01); *B60C 2011/0355* (2013.01); *B60C 2011/0365* (2013.01); *B60C 2011/0367* (2013.01); *B60C 2011/0388* (2013.01); *Y02T 10/862* (2013.01)

(58) Field of Classification Search
CPC . B60C 11/0309; B60C 11/13; B60C 11/1315; B60C 2011/0353; B60C 2011/0355; B60C 2011/0365; B60C 2011/0367; Y10S 152/902
USPC ............................................. 152/209.24, 902
See application file for complete search history.

(56) References Cited

U.S. PATENT DOCUMENTS

| | | | | |
|---|---|---|---|---|
| 5,417,268 A | * | 5/1995 | Kishi | B60C 11/0309 152/209.18 |
| 5,450,885 A | * | 9/1995 | Hanya | B60C 11/0083 152/209.26 |
| 5,628,843 A | * | 5/1997 | Hanya | B60C 11/0309 152/209.24 |
| 5,645,657 A | * | 7/1997 | Iwasaki | B60C 11/0083 152/209.15 |
| 6,079,464 A | * | 6/2000 | Hatakenaka | B60C 11/00 152/209.24 |

(Continued)

FOREIGN PATENT DOCUMENTS

JP  2013-132966 A  7/2013

*Primary Examiner* — Seyed Masoud Malekzadeh
(74) *Attorney, Agent, or Firm* — Birch, Stewart, Kolasch & Birch, LLP

(57) ABSTRACT

A pneumatic tire is provided in the tread portion with a main groove and an axial groove. The groove-sidewall surface on each side of the main groove is formed by a circular-arc-like surface having a radius R1 of curvature and being convex to the groove center side. The groove-sidewall surface on each side of the axial groove is formed by a circular-arc-like surface having a radius R2 of curvature and being convex to the groove center side. The radius R2 of curvature of the groove-sidewall surface of the axial groove is more than the radius R1 of curvature of the groove-sidewall surface of the main groove.

6 Claims, 5 Drawing Sheets

(56) References Cited

U.S. PATENT DOCUMENTS

| | | | | |
|---|---|---|---|---|
| 6,119,745 A | * | 9/2000 | Sugihara | B60C 11/0083 152/209.15 |
| 6,474,381 B1 | * | 11/2002 | Tsuda | B60C 11/0309 152/209.24 |
| 2006/0037684 A1 | * | 2/2006 | Vervaet | B60C 11/0302 152/209.24 |
| 2013/0160909 A1 | | 6/2013 | Atake | |

\* cited by examiner

PNEUMATIC TIRE

TECHNICAL FIELD

The present invention relates to a pneumatic tire improved in steering stability while maintaining wet performance and rolling resistance performance.

BACKGROUND ART

In recent years, a pneumatic tire improved in wet performance and the like by specifically defining a shape and the like of a groove has been proposed. For example, the following patent document 1 proposes a pneumatic tire in which wet performance and anti-noise performance are improved by making the groove depth of an axially extending axial groove smaller than the groove depth of a circumferentially continuously extending main groove.

Such pneumatic tire, however, has a problem such that an axial rigidity of a land portion becomes relatively small, and steering stability is deteriorated.

PRIOR ART DOCUMENT

Patent Document

[Patent document 1] Japanese Patent Application Publication No. 2013-132966

SUMMARY OF THE INVENTION

Technical Problem

The present invention was made with the view to the above-mentioned actual circumstances, and a primary object of the present invention is to provide a pneumatic tire in which by specifically defining a shape and the like of a groove, steering stability is improved while maintaining wet performance and rolling resistance performance.

Solution to Problem

The present invention is a pneumatic tire provided in a tread portion with a circumferentially continuously extending main groove and an axially extending axial groove, and characterized in that a groove-sidewall surface on each side of the main groove is formed by a circular-arc-like surface of a radius R1 of curvature which is convex to a groove center side in a groove section perpendicular to a length direction of the groove, a groove-sidewall surface on each side of the axial groove is formed by a circular-arc-like surface of a radius R2 of curvature which is convex to a groove center side in a groove section perpendicular to a length direction of the groove, and the radius R2 of curvature of the groove-sidewall surface of the axial groove is more than the radius R1 of curvature of the groove-sidewall surface of the main groove.

In the pneumatic tire according to the present invention, it is preferable that the ratio R1/R2 of the radius R1 of curvature and the radius R2 of curvature is 0.75 to 0.90.

In the pneumatic tire according to the present invention, it is preferable that the radius R1 of curvature is 65 to 75 mm.

In the pneumatic tire according to the present invention, it is preferable that the radius R2 of curvature is 80 to 95 mm.

In the pneumatic tire according to the present invention, it is preferable that the main groove includes a pair of center main grooves provided on both sides of the tire equator, and a pair of shoulder main grooves provided axially outside the respective center main grooves and on the most tread ground contact edge sides, the axial groove includes a center axial groove provided between a pair of the center main grooves, a middle axial groove provided between the center main groove and the shoulder main groove, and a shoulder axial groove provided axially outside the shoulder main groove, the radius R2c of curvature of the groove-sidewall surface of the center axial groove is more than the radius R1c of curvature of the groove-sidewall surface of the center main groove, and the radius R2m of curvature of the groove-sidewall surface of the middle axial groove and the radius R2s of curvature of the groove-sidewall surface of the shoulder axial groove are more than the radius R1 of curvature of the groove-sidewall surface of the shoulder main groove.

In the pneumatic tire according to the present invention, it is preferable that the radius R2s of curvature of the shoulder axial groove is more than the radius R2m of curvature of the middle axial groove.

Effect of the Invention

The pneumatic tire according to the present invention is provided in the tread portion with the circumferentially continuously extending main groove and the axially extending axial groove.

The groove-sidewall surface on each side of the main groove is formed by the circular-arc-like surface of the radius R1 of curvature convex to the groove center side in the groove section perpendicular to the length direction of the groove.

The groove-sidewall surface on each side of the axial groove is formed by the circular-arc-like surface of the radius R2 of curvature convex to the groove center side in the groove section perpendicular to the length direction of the groove.

Such main groove and axial groove increase the rigidity of a land portion while minimizing a decrease in the volume of the grooves when compared with a groove whose groove-sidewall surfaces are a flat surface.

Consequently, the wet performance and the rolling resistance performance are improved in a well balanced manner.

The radius R2 of curvature of the groove-sidewall surface of the axial groove is larger than the radius R1 of curvature of the groove-sidewall surface of the main groove. This led to the main groove becoming difficult to deform in the width direction of the groove when compared with the axial groove. Accordingly, the land portion parted by the main groove and the axial groove is increased in the axial rigidity, and the steering stability is improved.

As described above, the pneumatic tire according to the present invention can be improved in the steering stability while maintaining the wet performance and the rolling resistance performance.

DESCRIPTION OF EMBODIMENTS

An embodiment of the present invention will now be described in detail in conjunction with the accompanying drawings.

Figure 1:
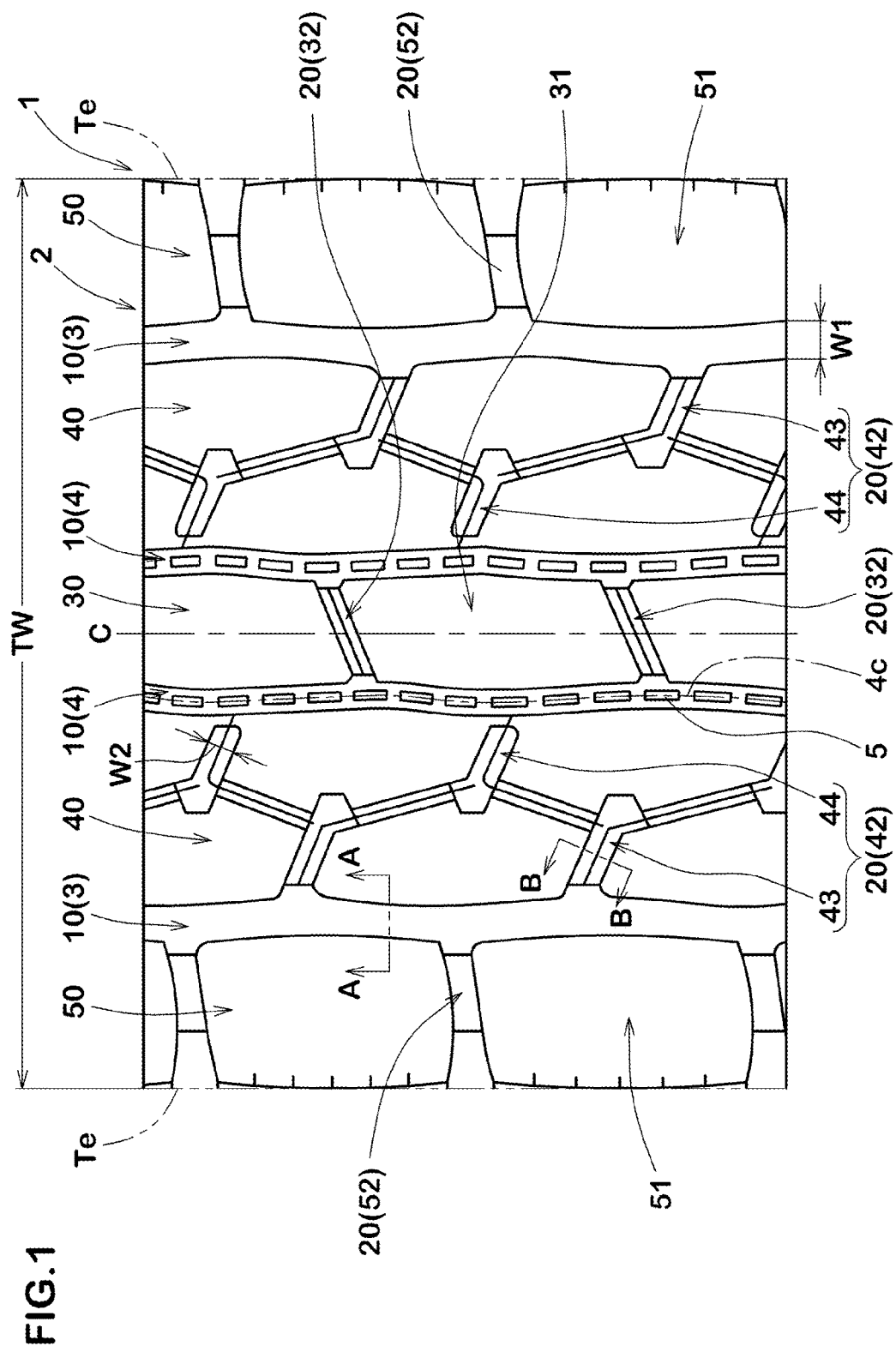
FIG. 1 is a developed view of a tread portion of a pneumatic tire according to this embodiment.

FIG. 1 is a developed view of a tread portion 2 of a pneumatic tire 1 (hereinafter, simply called "tire" depending on circumstances) in this embodiment. The pneumatic tire 1 in this embodiment is suitably used for heavy load vehicle, for example, truck, bus and the like.

The tread portion 2 is provided with circumferentially continuously extending main grooves 10, and axially extending axial grooves 20.

In this specification, the term "main groove" means a groove which extends continuously in the tire circumferential direction and of which groove width is not less than 2.5% of a tread width TW.

The term "axial groove" means a groove which extends in a direction intersecting the main groove 10 and which is discontinuous in the tire circumferential direction.

The groove width w1 of the main groove 10 in this embodiment is, for example, 2.5% to 4.5% of the tread width TW. The groove depth d1 of the main groove 10 is, for example, 8 to 24 mm.

The tread width TW is the axial distance between the tread ground contact edges Te, Te of the tire 1 under a normal state.

The normal state is such a state that the tire is mounted on a standard wheel rim (not shown), inflated to a normal inner pressure, and loaded with no tire load.

In this specification, dimensions and the like of various tire portions refer to values measured under the normal state unless otherwise noted.

The "standard wheel rim" is a wheel rim specified for the tire by a standard included in a standardization system on which the tire is based, for example, the "normal wheel rim" in JATMA, "Design Rim" in TRA, and "Measuring Rim" in ETRTO.

The "normal inner pressure" is air pressure specified for the tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "tread ground contact edges Te" are the axially outermost ground contacting positions of the tire 1 under the normal state which is load with a standard load and grounded on a flat surface at a camber angle of zero degree.

The "standard load" is a load specified for the tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The groove width w2 of the axial groove 20 in this embodiment is, for example, not less than 0.40 times, more preferably not less than 0.50 times, and preferably not more than 0.65 times, more preferably not more than 0.55 times the groove width w1 of the main groove 10.

Such axial groove 20 improves wet performance while maintaining required rigidity of a land portion.

From a similar standpoint, the groove depth d2 of the axial groove 20 is preferably not less than 0.50 times, more preferably not less than 0.60 times, and preferably not more than 0.80 times, more preferably not more than 0.70 times the groove depth d1 of the main groove 10.

For example, the main grooves 10 in this embodiment include a pair of shoulder main grooves 3, 3 disposed on both sides of the tire equator C and on the most tread ground contact edge Te sides, and a pair of center main grooves 4, 4 disposed on both sides of the tire equator C and axially inside the shoulder main grooves 3.

Each of the shoulder main grooves 3 and the center main grooves 4 extends in the tire circumferential direction in a zigzag manner with a small amplitude.

It is preferable that each of the center main grooves 4, 4 is provided along the groove center line 4c with substantially rectangular protrusions 5, as raised groove bottom, at intervals. Such protrusions 5 effectively prevent stone entrapment in the center main groove 4.

The tread portion 2 of the tire 1 in this embodiment is provided with a center land portion 30 between a pair of the center main grooves 4, 4, a pair of middle land portions 40, 40 between the center main grooves 4 and the shoulder main grooves 3, and a pair of shoulder land portions 50, 50 axially outside the respective shoulder main grooves 3, 3.

The axial groove 20 includes center axial grooves 32 disposed in the center land portion 30, middle axial grooves 42 disposed in each of the middle land portions 40, and shoulder axial grooves 52 disposed in each of the shoulder land portions 50.

Figure 2:
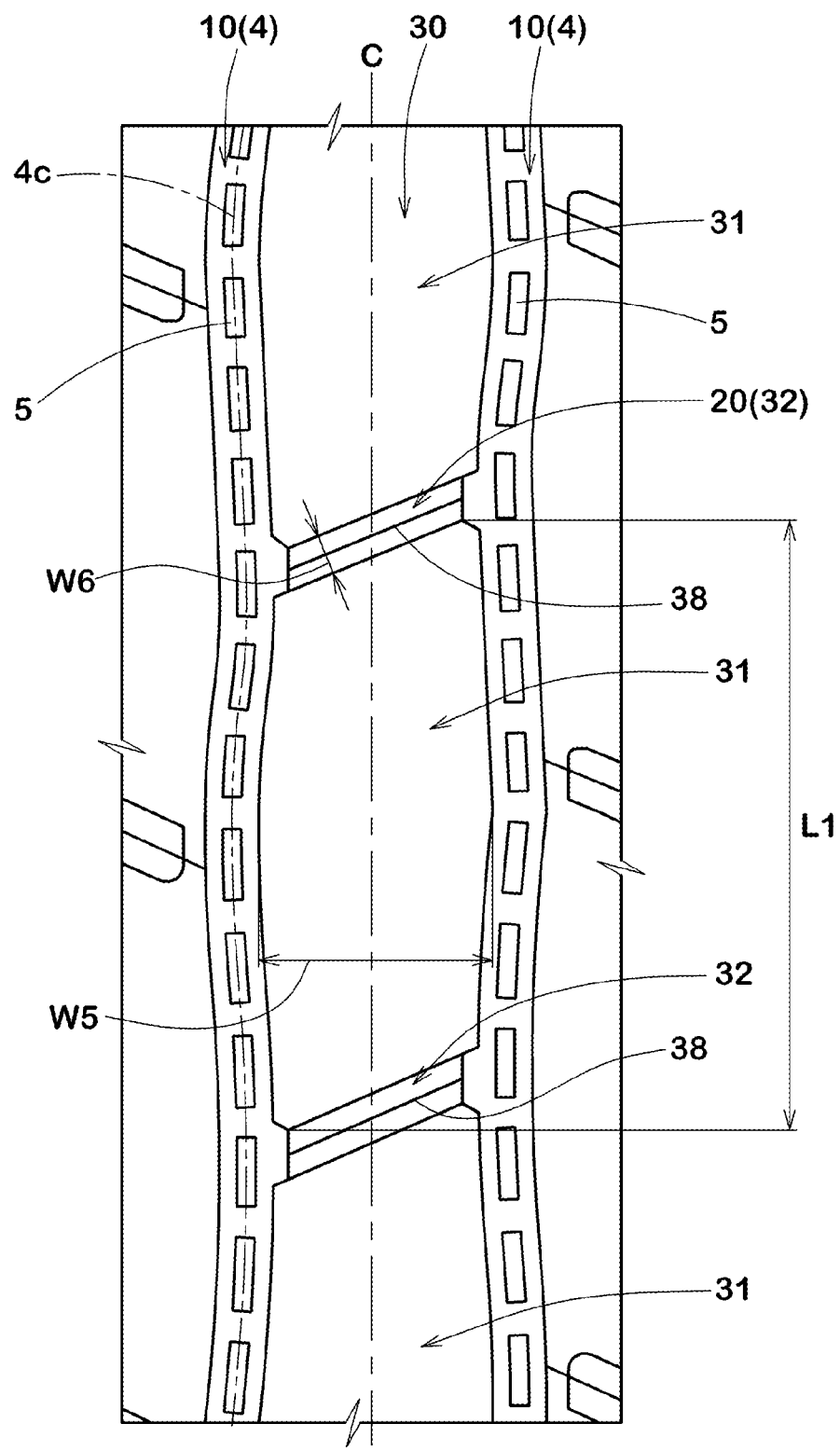
FIG. 2 is an enlarged view of a center land portion in FIG. 1.

In FIG. 2, an enlarged view of the center land portion 30 is shown. As shown in FIG. 2, the center land portion 30 is a block row in which center blocks 31 separated by the center axial grooves 32 are lined up in the tire circumferential direction.

The center block 31 is longer than is wide such that the length L1 in the tire circumferential direction is more than the width w5 in the tire axial direction. For example, the ratio w5/L1 of the width w5 and the length L1 of the center block 31 is 0.30 to 0.45. Thereby, deformation in the tire circumferential direction of the center block 31 is effectively suppressed, and the rolling resistance performance is improved.

The ratio w6/L1 of the groove width w6 of the center axial groove 32 and the length L1 of the center block 31 is preferably not less than 0.05, more preferably not less than 0.08, and preferably not more than 0.15, more preferably not more than 0.12. Thereby, the rolling resistance performance is improved, while maintaining the wet performance.

It is preferable that the center axial groove 32 in this embodiment is provided with a groove bottom sipe 38 opened in the groove bottom such groove bottom sipe 38 effectively improves the wet performance.

Incidentally, in this specification, the sipe means a groove whose width is less than 1.0 mm.

Figure 3:
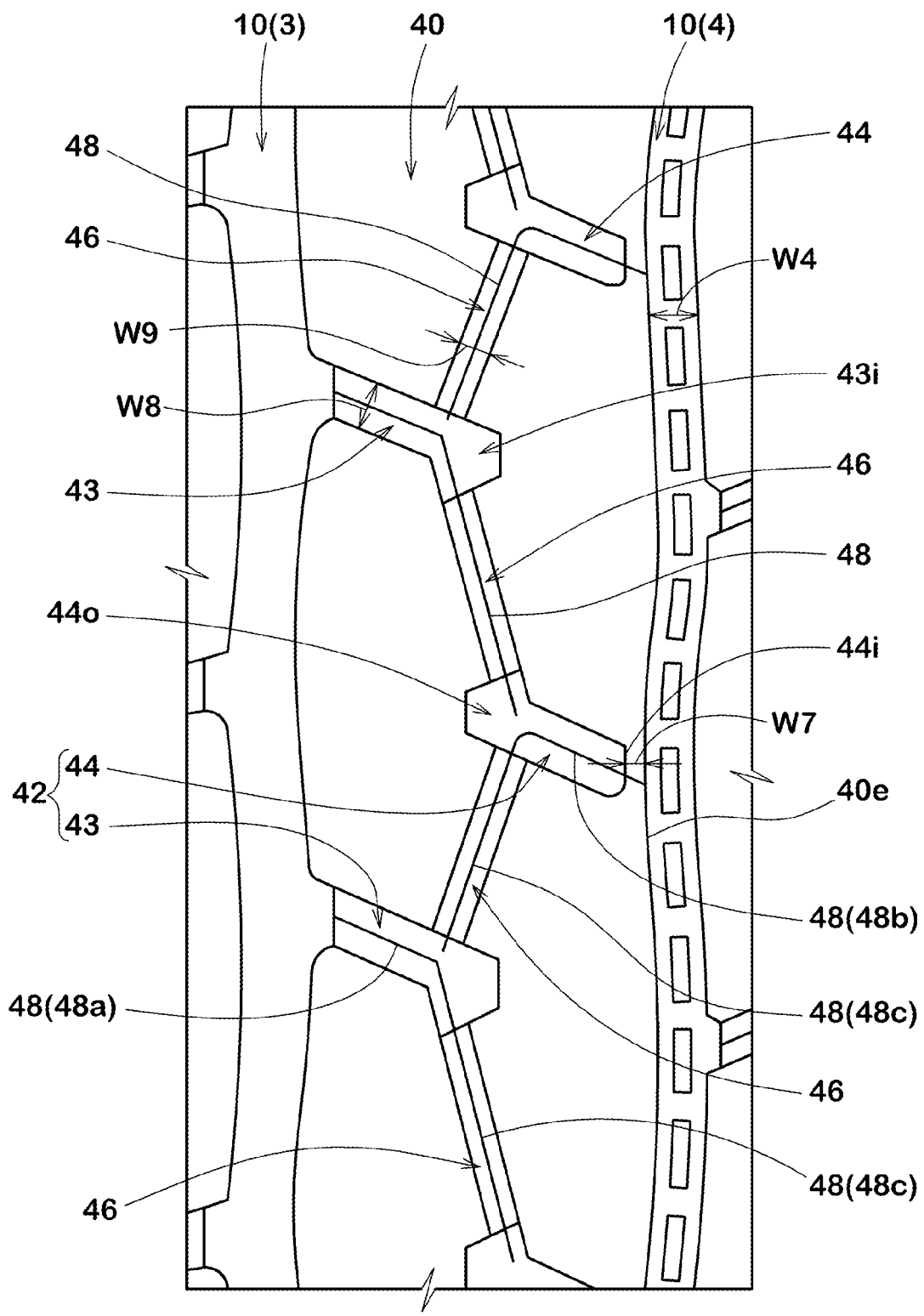
FIG. 3 is an enlarged view of a middle land portion in FIG. 1.

In FIG. 3, an enlarged view of the middle land portion 40 is shown. As shown in FIG. 3, the middle axial groove 42 disposed in the middle land portion 40 include outer middle axial grooves 43 and inner middle axial grooves 44.

The outer middle axial groove 43 is connected to the shoulder main groove 3 and terminates within the middle land portion 40. The inner middle axial groove 44 is disposed axially inside the outer middle axial groove 43, and both of the ends terminate within the middle land portion 40.

The axial distance w7 from the axially inner end 44i of the inner middle axial groove 44 to the end 40e on a tire equator C side of the middle land portion 40 is preferably not less than 0.35 times, more preferably not less than 0.40 times, and preferably not more than 0.50 times, more preferably not more than 0.45 times the groove width w4 of the center main groove 4. Thereby, the rigidity of an axially inside of the middle land portion 40 can be increased, while maintaining the wet performance.

For example, it is preferable that the outer middle axial grooves 43 and the inner middle axial grooves 44 are disposed alternately in the circumferential direction. Such outer middle axial grooves 43 and inner middle axial grooves 44 improve the wet performance, while preventing uneven wear of the middle land portion 40.

It is preferable that the middle land portion 40 is provided with middle auxiliary grooves 46.

The middle auxiliary groove 46 extends zigzag, connecting between the axially inner end portions 43i of the outer middle axial grooves 43 and the axially outer end portions 44o of the inner middle axial grooves 44. Such middle auxiliary groove 46 effectively increases the wet performance.

For example, the groove width w9 of the middle auxiliary groove 46 is 1.0% to 2.0% of the tread width TW (shown in FIG. 1). Such middle auxiliary groove 46 improves the wet performance, while maintaining the steering stability.

It is preferable that the outer middle axial grooves 43, the inner middle axial grooves 44 and the middle auxiliary groove 46 are each provided with a groove bottom sipe 48 opened in the groove bottom. Such groove bottom sipe 48 effectively improve the wet performance.

For example, it is preferable that the groove bottom sipe 48c of the middle auxiliary groove 46 in this embodiment is connected to either one of the groove bottom sipe 48a of the outer middle axial groove 43 and the groove bottom sipe 48b of the inner middle axial groove 44. Thereby, the rigidity of the middle land portion 40 is maintained, and good steering stability is exerted.

Figure 4:
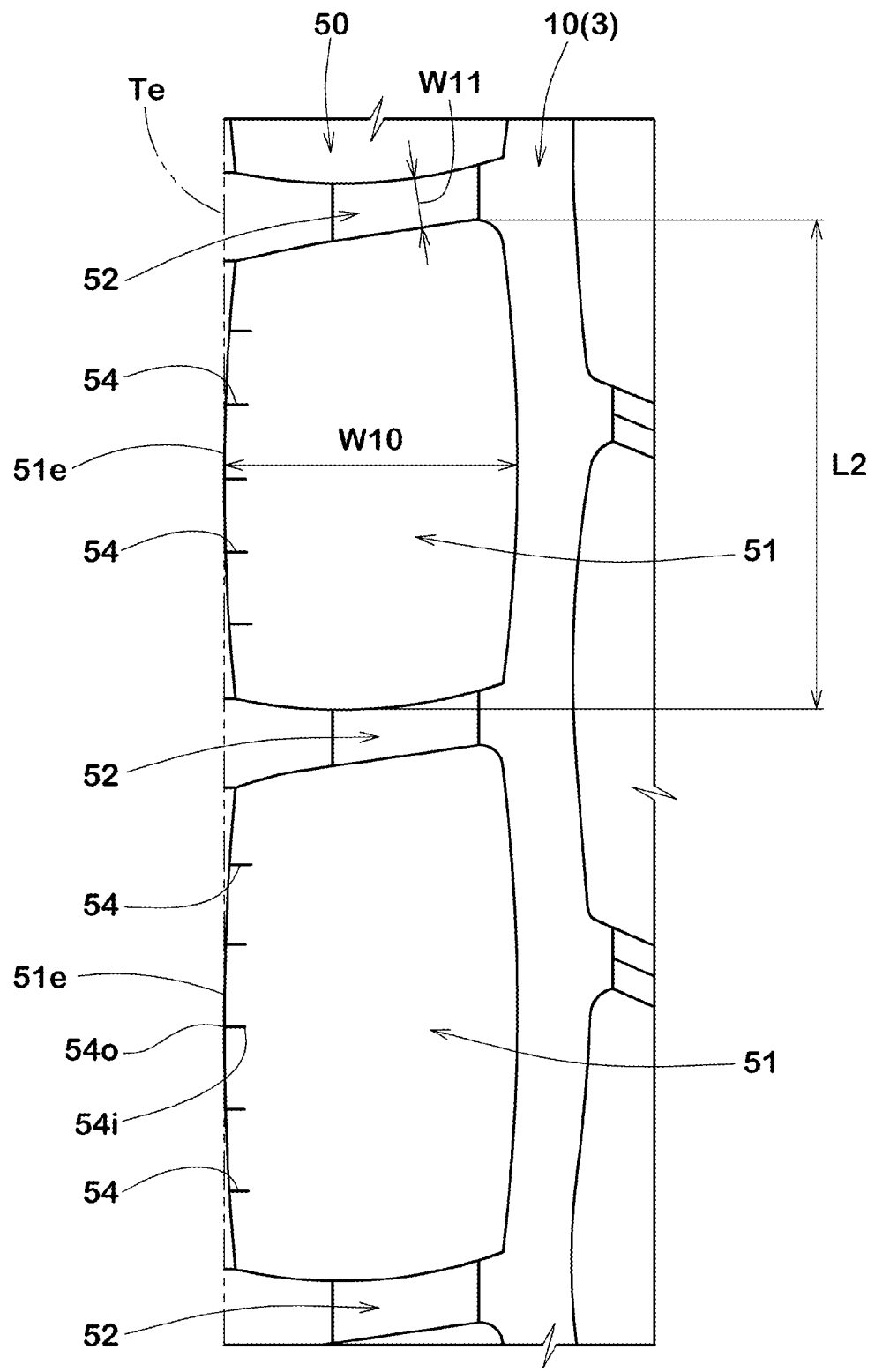
FIG. 4 is an enlarged view of a shoulder land portion in FIG. 1.

In FIG. 4, an enlarged view of the shoulder land portion 50 is shown. As shown in FIG. 4, the shoulder land portion 50 is a block row in which shoulder blocks 51 separated by the shoulder axial grooves 52 are lined up in the tire circumferential direction.

The shoulder block 51 is longer than is wide such that the length L2 in the tire circumferential direction is more than the width w10 in the tire axial direction. For example, the ratio w10/L2 of the width w10 and the length L2 of the shoulder block 51 is 0.50 to 0.65. Thereby, deformation in the tire circumferential direction, of the shoulder block 51 is effectively suppressed, and the rolling resistance performance is improved.

The ratio w11/L2 of the groove width w11 of the shoulder axial groove 52 and the length L2 of the shoulder block 51 is preferably not less than 0.05, more preferably not less than 0.08, but preferably not more than 0.15, more preferably not more than 0.12. Thereby, the rolling resistance performance is improved, while maintaining the wet performance.

It is preferable that the shoulder block 51 is provided with a plurality of shoulder sipes 54.

The shoulder sipe 54 has one end 54o connected to an edge 51e of the shoulder block 51 extending in the tire circumferential direction on the tread ground contact edge Te side and the other end 54i terminating within the shoulder block 51.

Such shoulder sipes 54 improve the wet performance and wandering performance.

As shown in FIG. 1, the pitch number of the center axial grooves 32 around the tire, the pitch number of the middle axial grooves 42 around the tire, and the pitch number of the shoulder axial grooves 52 around the tire are preferably not less than 40, more preferably not less than 43, and preferably not more than 50, more preferably not more than 47. Thereby, the wet performance and the rolling resistance performance are improved in a well balanced manner.

Figure 5A:
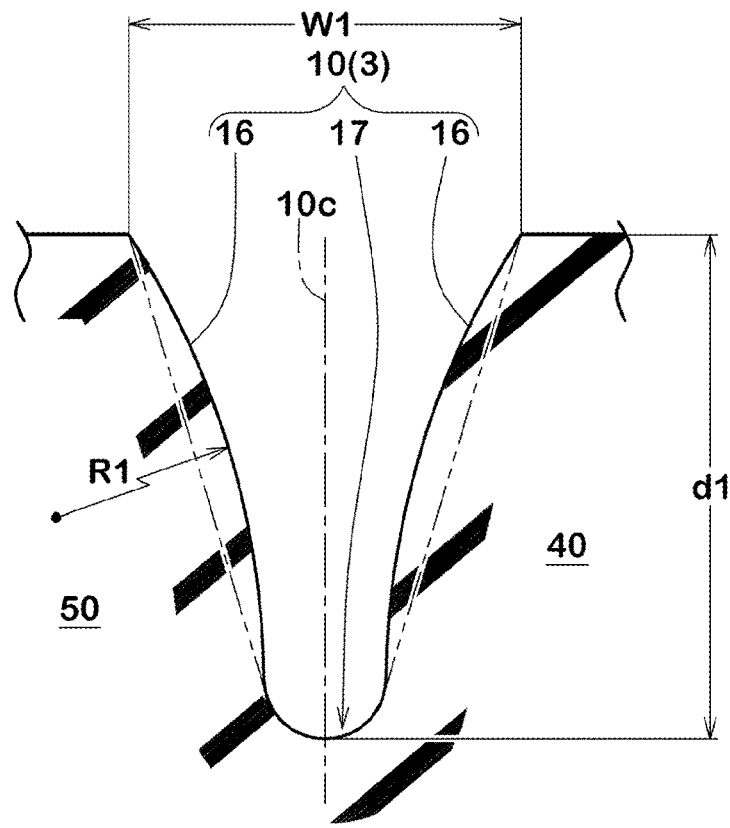
FIG. 5(a) is a cross sectional view of the main groove taken along line A-A in FIG. 1.

In FIG. 5(a), shown as a typical example of the main groove 10 is the A-A cross section of the shoulder main groove 3 in FIG. 1 perpendicular to the length direction of the groove. As shown in FIG. 5(a), the main groove 10 includes groove-sidewall surfaces 16, 16 on both sides, and a groove bottom part 17 connecting between the groove-sidewall surfaces.

The groove bottom part 17 of the main groove 10 smoothly continues to each of the groove-sidewall surfaces 16, 16, forming a circular-arc which is concave toward the radially inside. Thereby, local stress concentration on the groove bottom part 17 and the groove-sidewall surfaces 16 is suppressed, and damage of the tread portion staring from the groove bottom part 17 is prevented.

In the present invention, the groove-sidewall surfaces 16, 16 on both sides of the main groove 10 are formed by the circular-arc-like surface having the radius R1 of curvature and being convex to the groove center 10c side.

Such main groove 10 increases the rigidity of the land portions 40, 50, while minimizing the decrease in the volume of the groove, when compared with a groove whose groove-sidewall surfaces are a flat surface as indicated by imaginary line. Accordingly, both of the wet performance and the rolling resistance performance are satisfied.

The radii R1 of curvature of the groove-sidewall surfaces 16 of the main groove 10 are preferably not less than 65 mm, more preferably not less than 70 mm, and preferably not more than 80 mm, more preferably not more than 75 mm. Such groove-sidewall surfaces 16 improve the wet performance and the rolling resistance performance in a well balanced manner.

Figure 5B:
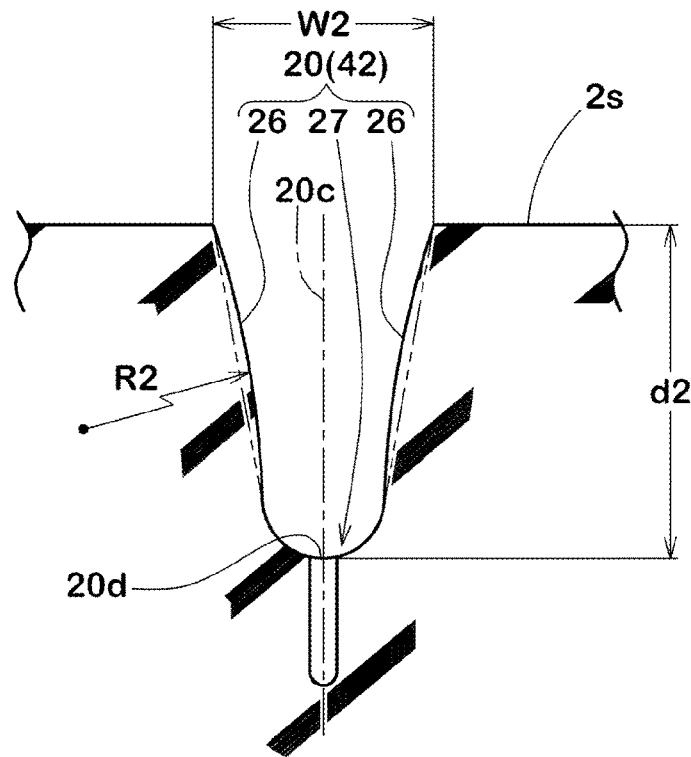
FIG. 5(b) is a cross sectional view of the axial groove taken along line B-B in FIG. 1.

In FIG. 5(b), shown as a typical example of the axial groove 20 is the B-B cross section of the middle axial groove 42 in FIG. 1 perpendicular to the length direction. As shown in FIG. 5(b), the axial groove 20 includes groove-sidewall surfaces 26, 26 on both sides, and a groove bottom part 27 connecting between the groove-sidewall surfaces 26, 26.

The groove bottom part 27 of the axial groove 20 smoothly continues to each of the groove-sidewall surfaces 26, 26, forming a circular-arc which is concave towards the radially inside. Thereby, local stress concentration on the groove bottom part 27 and the groove-sidewall surfaces 26 is suppressed, and damage of the tread portion staring from the groove bottom part 27 of the axial groove 20 is prevented.

The groove-sidewall surfaces 26, 26 on both sides of the axial groove 20 are formed by a circular-arc-like surface having a radius R2 of curvature and being convex to the groove center 20c side. Such axial groove 20 increases the rigidity of the land portions, while minimizing the decrease in the volume of the groove, when compared with a groove whose groove-sidewall surfaces are a flat surface as indicated by imaginary line. Accordingly, both of the wet performance and the rolling resistance performance are satisfied.

The radius R2 of curvature of the groove-sidewall surface 26 of the axial groove 20 is more than the radius R1 of curvature of the groove-sidewall surface 16 of the main groove 10 as shown in FIG. 5(a). Thereby, the main groove 10 becomes hard to deform in the widthwise direction of the groove when compared with the axial groove 20. Accordingly, the axial rigidity of the land portion separated by the main groove 10 and the axial groove 20 is increased, and the steering stability is improved.

The radius R2 of curvature of the groove-sidewall surface 26 of the axial groove 20 is preferably not less than 80 mm, more preferably not less than 85 mm, and preferably not more than 95 mm, more preferably not more than 90 mm.

Such groove-sidewall surfaces 26 improve the wet performance and the rolling resistance performance in a well balanced manner.

The ratio R1/R2 of the radius R1 of curvature of the groove-sidewall surface 16 of the main groove 10 and the radius R2 of curvature of the groove-sidewall surface 26 of the axial groove 20 is preferably not less than 0.75, more preferably not less than 0.80, and preferably not more than 0.90, more preferably not more than 0.85. Thereby, the rolling resistance performance and the steering stability are improved in a well balanced manner.

It is preferable that, as shown in FIG. 1, the radius R2c of curvature of the groove-sidewall surface of the center axial groove 32 is more than the radius R1c of curvature of the groove-sidewall surface of the center main groove 4.

In addition, it is preferable that the radius R2m of curvature of the groove-sidewall surface of the middle axial groove 42 and the radius R2s of curvature of the groove-sidewall surface of the shoulder axial groove 52 are more than the radius R1s of curvature of the groove-sidewall surface of the shoulder main groove 3. Thereby, each land portion is improved in the rigidity balance between the tire axial direction and the tire circumferential direction.

It is preferable that the radius R2s of curvature of the shoulder axial groove 52 is more than the radius R2m of curvature of the middle axial groove 42.

In such shoulder axial groove 52, the decrease in the groove volume is lessened, and the wet performance is improved. Further, since reinforcing effect of the shoulder block 51 is relatively decreased by the shoulder axial groove 52, anti-wandering performance is improved.

while description has been made of the especially preferable embodiment of the present invention, the present invention should not be limited to the illustrated embodiment. It is possible to carry out the invention by changing into various embodiments.

WORKING EXAMPLES

Pneumatic tires having the tread pattern shown in FIG. 1 were experimentally manufactured in accordance with specifications listed in Table 1.

Further, a tire having a main groove and an axial groove whose groove-sidewall surfaces were a flat surface was experimentally manufactured as a comparative example 1, and a tire having a main groove and an axial groove whose groove-sidewall surfaces were concave was experimentally manufactured as a comparative example 2.

Each of the test tires was tested for the rolling resistance performance, wet performance, and steering stability. Specifications common to all of the test tires are as follows:

tire size: 275/80R22.5 rim size: 22.5×7.5 tire inner pressure: 900 kPa tread width TW: 248 mm

The test methods are as follows.

<Rolling Resistance Performance>

Using a rolling resistance tester, the rolling resistance was measured under the following conditions.

The evaluation is a reciprocal number of a value of the rolling resistance, and indicated by an index based on the number of comparative example 1 being 100. The larger the value, the smaller or better the rolling resistance.

load: 33.83 kN speed: 80 km/h

<Wet Performance>

Under the following conditions, a passing time of the test car when passing through a test course whose overall length was 10 m was measured.

The evaluation is a reciprocal number of the passing time, and indicated by an index based on the number of comparative example 1 being 100. The larger the value, the shorter or better the passing time.

test car: 10 ton truck (2-D)

loading state: half loaded in front of the loading space test tire installation positions: all wheels road surface: asphalt with 5 mm depth water starting method: engaging the clutch with the second gear at 1500 rpm <Steering Stability>

The steering stability when an actual vehicle run was made on a test course formed by a dry asphalt road surface with the above-mentioned test car, was tested by the driver's feeling.

The result is a grade based on comparative example 1 being 100, the larger value is better.

The test results are shown in Table 1.

From the test results, it was confirmed that Embodiment tires were improved in the steering stability while maintaining the wet performance and the rolling resistance performance.

TABLE 1

|  | Ref. 1 | Ref. 2 | Ref. 3 | Ref. 4 | Ex. 1 | Ex. 2 | Ex. 3 |
| --- | --- | --- | --- | --- | --- | --- | --- |
| radius R1 of curvature of groove-sidewall surface of main groove (mm)(*) | — | −180.0 | 120.0 | 90.0 | 75.0 | 67.5 | 72.0 |
| radius R2 of curvature of groove-sidewall surface of axial groove (mm)(*) | — | −180.0 | 90.0 | 90.0 | 90.0 | 90.0 | 90.0 |
| radius R1 of curvature/radius R2 of curvature | — | 1.0 | 1.33 | 1.00 | 0.83 | 0.75 | 0.80 |

TABLE 1-continued

| | | | | | | | |
|---|---|---|---|---|---|---|---|
| existence or nonexistence of groove bottom sipe of axial groove | existence | existence | existence | existence | existence | existence | existence |
| existence or nonexistence of middle auxiliary groove | existence | existence | existence | existence | existence | existence | existence |
| rolling resistance performance (index) | 100 | 97 | 110 | 110 | 112 | 113 | 112 |
| wet performance (index) | 100 | 104 | 98 | 98 | 98 | 96 | 97 |
| steering stability(grade) | 100 | 96 | 103 | 104 | 111 | 111 | 111 |

| | Ex. 4 | Ex. 5 | Ex. 6 | Ex. 7 | Ex. 8 | Ex. 9 | Ex. 10 |
|---|---|---|---|---|---|---|---|
| radius R1 of curvature of groove-sidewall surface of main groove (mm)(*) | 76.5 | 81.0 | 86.0 | 56.0 | 60.0 | 64.0 | 67.5 |
| radius R2 of curvature of groove-sidewall surface of axial groove (mm)(*) | 90.0 | 90.0 | 90.0 | 75.0 | 75.0 | 75.0 | 75.0 |
| radius R1 of curvature/radius R2 of curvature | 0.85 | 0.90 | 0.96 | 0.75 | 0.80 | 0.85 | 0.90 |
| existence or nonexistence of groove bottom sipe of axial groove | existence | existence | existence | existence | existence | existence | existence |
| existence or nonexistence of middle auxiliary groove | existence | existence | existence | existence | existence | existence | existence |
| rolling resistance performance (index) | 112 | 111 | 110 | 114 | 113 | 113 | 112 |
| wet performance (index) | 98 | 98 | 98 | 94 | 95 | 96 | 96 |
| steering stability(grade) | 111 | 110 | 107 | 110 | 110 | 110 | 109 |

| | Ex. 11 | Ex. 12 | Ex. 13 | Ex. 14 | Ex. 15 |
|---|---|---|---|---|---|
| radius R1 of curvature of groove-sidewall surface of main groove (mm) | 72.0 | 75.0 | 75.0 | 75.0 | 75.0 |
| radius R2 of curvature of groove-sidewall surface of axial groove (mm) | 75.0 | 80.0 | 95.0 | 90.0 | 90.0 |
| radius R1 of curvature/radius R2 of curvature | 0.96 | 0.94 | 0.79 | 0.83 | 0.83 |
| existence or nonexistence of groove bottom sipe of axial groove | existence | existence | existence | nonexistence | existence |
| existence or nonexistence of middle auxiliary groove | existence | existence | existence | existence | nonexistence |
| rolling resistance performance (index) | 110 | 111 | 111 | 113 | 111 |
| wet performance (index) | 97 | 97 | 97 | 95 | 96 |
| steering stability(grade) | 108 | 108 | 111 | 111 | 111 |

(*)minus means groove-sidewall surface as being concave

The invention claimed is:

1. A pneumatic tire comprising:
a tread portion comprising:
a main groove extending continuously in a tire circumferential direction; and
a plurality of axial grooves extending from the main groove,
wherein:
the main groove has opposite main groove-sidewalls facing each other, each of the opposite main groove-sidewalls of the main groove is formed by a curved surface which is convex toward a widthwise center of the main groove in a cross section of the main groove perpendicular to a longitudinal direction of the main groove, and the curved surface of each of the opposite main groove-sidewalls is a circular-arc having a radius R1 of curvature in the cross section of the main groove perpendicular to the longitudinal direction of the main groove,
each of the axial grooves has opposite axial groove-sidewalls facing each other, each of the opposite axial groove-sidewalls of the respective axial groove is formed by a curved surface which is convex toward a widthwise center of the respective axial groove in a cross section of the respective axial groove perpendicular to a longitudinal direction of the respective axial groove, and the curved surface of each of the opposite axial groove-sidewalls for the respective axial groove is a circular-arc having a radius R2 of curvature in the cross section of the respective axial groove perpendicular to the longitudinal direction of the respective axial groove, said radius R2 of curvature is in a range from 80 to 95 mm, and
a ratio R1/R2 of said radius R1 of curvature to said radius R2 of curvature is 0.75 to 0.90.

2. The pneumatic tire according to claim 1, wherein the radius R1 of curvature is 65 to 75 mm.

3. A pneumatic tire comprising:
a tread portion comprising:
a main groove extending continuously in a tire circumferential direction; and
a plurality of axial grooves extending from the main groove,
wherein:
the main groove has opposite main groove-sidewalls each formed by a curved surface which is convex toward a widthwise center of the main groove in a cross section of the main groove perpendicular to a longitudinal direction of the main groove and the curved surface of each of the opposite main groove-sidewalls is a circular-arc having a radius R1 of curvature in the cross section of the main groove perpendicular to the longitudinal direction of the main groove,
each of the axial grooves has opposite axial groove-sidewalls each formed by a curved surface which is convex toward a widthwise center of the respective axial groove in a cross section of the respective axial groove perpendicular to a longitudinal direction of the respective axial groove, and the curved surface of each of the opposite axial groove-sidewalls for the respective axial groove is a circular-arc having a radius R2 of curvature in the cross section of the respective axial groove perpendicular to the longitudinal direction of the respective axial groove, and
a ratio R1/R2 of said radius R1 of curvature to said radius R2 of curvature is less than 1,
wherein
the main groove includes a pair of center main grooves provided on both sides of a tire equator, and a pair of shoulder main grooves provided axially outside the respective center main grooves,
the axial grooves include a center axial groove provided between the pair of the center main grooves, a middle axial groove provided between the pair of the center main grooves and the pair of the shoulder main grooves, and a shoulder axial groove provided axially outside the pair of the shoulder main grooves, a radius $R2c$ of curvature of a groove-sidewall surface of the center axial groove is larger than a radius $R1c$ of curvature of a groove-sidewall surface of the respective center main groove, and a radius $R2m$ of curvature of a groove-sidewall surface of the middle axial groove and a radius $R2s$ of curvature of a groove-sidewall surface of the shoulder axial groove are larger than a radius $R1s$ of curvature of a groove-sidewall surface of the respective shoulder main groove.

4. The pneumatic tire according to claim 3, wherein the radius $R2s$ of curvature of the shoulder axial groove is larger than the radius $R2m$ of curvature of the middle axial groove.

5. The pneumatic tire according to claim 3, wherein a ratio $R1/R2$ of the radius $R1$ of curvature and the radius $R2$ of curvature is 0.75 to 0.90.

6. The pneumatic tire according to claim 5, wherein the radius $R1$ of curvature is 65 to 75 mm.

* * * * *